United States Patent [19]

Tanabe et al.

[11] 4,204,011

[45] May 20, 1980

[54] METHOD OF DRIVING POWDERY MATERIAL INTO POROUS MATERIAL OF OPEN-CELLED STRUCTURE

[75] Inventors: Naoto Tanabe, Takatsuki; Kenzoh Okada; Norio Maeda, both of Neyagawa, all of Japan

[73] Assignee: Kurashiki Boseki Kabushiki Kaisha, Kurashiki, Japan

[21] Appl. No.: 921,170

[22] Filed: Jun. 30, 1978

[30] Foreign Application Priority Data

Jul. 4, 1977 [JP] Japan .................................. 52/80281

[51] Int. Cl.² .............................................. B05D 3/12
[52] U.S. Cl. ........................................ 427/57; 118/57; 427/180; 427/346
[58] Field of Search ................. 427/57, 346, 243, 347, 427/180; 118/57; 425/456

[56] References Cited

U.S. PATENT DOCUMENTS

| 2,085,420 | 6/1937 | Day ................................. 427/346 X |
| 3,904,724 | 9/1975 | Kipple et al. ....................... 118/57 X |

FOREIGN PATENT DOCUMENTS

| 749907 | 1/1967 | Canada ....................................... 427/57 |
| 854674 | 10/1970 | Canada ..................................... 427/180 |
| 38-22463 | 10/1963 | Japan ....................................... 427/346 |
| 50-76181 | 6/1975 | Japan ......................................... 427/57 |

OTHER PUBLICATIONS

Stokes et al., *Applications of Sonic Energy in the Process Industries* in *Ultrasonics-Two Symposia*, American Institute of Chemical Engineers, New York, N.Y., 1951, p. 11.

*Primary Examiner*—Evan K. Lawrence
*Attorney, Agent, or Firm*—Wenderoth, Lind & Ponack

[57] ABSTRACT

A method of driving or permeating a powdery material into a porous material such as an open-cell cellular material or a fabric, of a type having an open-celled structure, that is, having interconnected cells. Permeation of the powdery material into the porous material is carried out by spreading a mass of powdery particles on one surface of the porous material and applying vibrations to the powdery particles through a vibrating element in contact with the particles so as to cause the particles to be uniformly distributed in the porous material. The frequency and amplitude of the vibrations are selected so as to minimize scattering of the powdery material, and are within the ranges of 50 to 50,000 Hz, and 50 to 1,500 μm, respectively.

6 Claims, 2 Drawing Figures

METHOD OF DRIVING POWDERY MATERIAL INTO POROUS MATERIAL OF OPEN-CELLED STRUCTURE

BACKGROUND OF THE INVENTION

The present invention relates to a method of driving a powdery material into a porous material and, more particularly, to a method of driving powdery particles into interconnected voids in a porous material such as open cell cellular materials or fabric materials.

As is well known to those skilled in the art, two types of porous material are generally available depending upon the pattern of distribution of the gas phase in voids or pockets which are generally called cells, open-celled and closed-celled. The open-celled material is known as having the cells interconnected in such a manner that gas may pass from one to another, whereas the closed-celled material is known as a material wherein the cells are discrete and the gas phase of each is independent of that of the other cells. Of these two types of porous material, it is the open-celled material to which the present invention is directed.

The open-celled material to which the present invention is directed is porous material, such as open cell cellular materials or fabric materials.

Heretofore, two methods have been widely used in distributing powdery particles in interconnected cells of a porous material. One method utilizes a high pressure necessary to drive the powdery material into the porous material in a direction in which the high pressure is applied, and the other method utilizes a suction force necessary to draw the powdery material into the porous material from one of the opposite surfaces of the porous material towards the other in a direction in which air is drawn.

The practice of any one of these prior art methods requires the employment of a recovery equipment for recovering some of the powdery particles which have completely passed through the thickness of the porous material, and therefore requires a relatively large space for installation of such recovery equipment. Moreover, in view of the fact that some of the powdery particles tend to pass completely through the thickness of the porous material, no substantial uniform distribution of the powdery particles in the porous material can be achieved with no difficulty and this is particularly true of the case where the powdery particles are desired to be distributed over a relatively large surface area in the porous material.

However, the Japanese Patent Laid-open Publication published on June 21, 1975 under No. 50-76181 suggests the possibility of utilization of vibrations for causing the powdery particles to be permeated into the porous material of an open-celled structure, but has failed to disclose a concrete method and equipment necessary to achieve it.

SUMMARY OF THE INVENTION

Accordingly, the present invention has been made in view to substantially eliminating the disadvantages and inconveniences inherent in the prior art methods and is intended to provide an improved method of driving the powdery particles into the open-celled structure of the porous material, which is practised by the utilization of vibrations.

Another object of the present invention is to provide an improved method of the type referred to above, which does not substantially require the use of a relatively comlicated and bulky equipment in the practice of the method of the present invention.

These and other objects of the present invention can readily be achieved by applying vibrations to a layer of powdery particles spread on one surface of the porous material, the frequency and amplitude of which are preferably within the range of 50 to 50,000 Hz and within the range of 5 to 1,500 $\mu$m, respectively. As a source of the vibrations, either an ultrasonic generator of a construction having a horn and a vibrating plate capable of undergoing flexure vibrations or an electromechanical oscillator may be employed. More preferably, where the vibrations of a relatively high frequency within the above described frequency range are desired in the practice of the method of the present invention, the use of the ultrasonic generator is recommended while, where the vibrations of a relatively low frequency within the above described frequency range are desired, the use of the electromechanical oscillator is recommended.

In the practice of the method of the present invention, the amount of energies of vibration is determined by the relationship between the frequency and the amplitude of vibrations generated by the source of vibration and is to be selected in consideration of the density of cells of the porous material, the thickness of the porous material, and/or the type and size of the powdery particles used. More specifically, where the vibrations of relatively high frequency within the above described frequency range are desired, they should have a relatively low amplitude within the amplitude range described above while, where the vibrations of relatively low frequency within the above described frequency range are desired, they should have a relatively high amplitude within the above described amplitude range. With the frequency and amplitude of the vibrations so selected, scattering of the powdery particles towards an area other than the area of contact of the vibrating element to the layer of powdery particles on one surface of the porous material can be minimized and, because of uniform distribution of pressure over the entire area of contact of the vibrating element to the power layer, uniform permeation of the powdery particles into the porous structure can be achieved.

It is to be noted that, if the frequency of the vibrations is lower than the lowermost limit of 50 Hz, such vibrations must have a considerably high amplitude in order for the powdery particles to be sufficiently permeated into the porous structure and the use of the considerably high amplitude at the lower frequency would result in scattering of some of the powdery particles and also in uneven distribution of the powdery particles into the porous structure. On the other hand, if the frequency of the vibrations is higher than the uppermost limit of 50,000 Hz, vibrations of high amplitude can hardly be produced and, therefore, no sufficient permeation of the powdery particles into the porous material can be achieved.

The source of vibrations to be used in the practice of the method of the present invention includes the vibrating element which may be in the form of either a plate or a rod.

In the practice of the method of the present invention, this vibrating element of the vibration source is applied under a slight pressure to the layer of powdery particles on one surface of the porous material into which the powdery particles are desired to be permeated, during the application of the vibrations from the vibration source. However, in the case where direct contact of the vibrating element to the powdery layer on the surface of the porous material can be impossible, the vibrating element may be positioned a predetermined distance spaced from the powder layer.

In order to spread the powdery particles on the surface of the porous material prior to the vibrations being applied, any known method may be employed. By way of example, they may be spread on the surface of the porous material by placing a mass of powdery particles thereon and then distributing them by the use of a doctor knife. Alternatively, the use may be made of a screw feeder capable of quantitatively spreading the powdery particles.

It is to be noted that the powdery material which may be employed in the practice of the method of the present invention may include a bonding agent, such as copolymerized nylon having a low melting point, a deodorant, such as an activated carbon, or any other quality modifier and must have a particle size sufficient to allow the powdery particles to permeate into the porous material. On the other hand, the porous material which may be employed in the practice of the method of the present invention may include nonwoven fabrics such as a random web.

BRIEF DESCRIPTION OF THE DRAWING

These and other objects and features of the present invention will become apparent from the following description taken by way of example with reference to the accompanying drawings, in which.

DETAILED DESCRIPTION OF THE INVENTION

Figure 1:
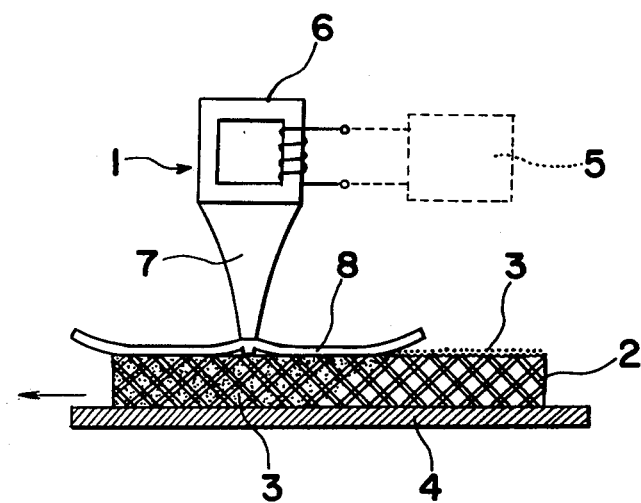
FIG. 1 is a schematic diagram showing the use of a ultrasonic generator in the practice of the method of the present invention.

Referring first to FIG. 1, there is illustrated a ultrasonic generator 1 which comprises an electric oscillator 5, a magnetostrictive vibrating element 6, an exponential horn 7 and a vibrating plate 8 made of juralumin and secured to one end of the horn 7 remote from the magnetostrictive vibrating element 6.

Figure 2:
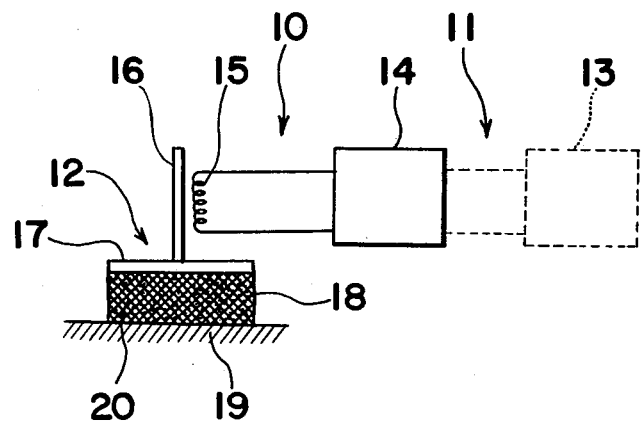
FIG. 2 is a schematic diagram showing the use of an electromechanical vibrator in the practice of the method of the present invention.

In FIG. 2, there is illustrated another type of the vibration source which is in the form of an electromechanical vibrator 10 comprising a power source section 11, including an electric oscillator 13 and an amplifier 14, and a vibration applying section 12 including an exciting coil 15, a vibration transmitting rod 16 and a vibrating plate 17 made of juralumin and secured to one end of the vibration transmitting rod 16 remote from the exciting coil 15.

The present invention will now be described by way of example.

EXAMPLE I

By the use of the apparatus shown in FIG. 1 wherein the vibrating plate 8 was 1 mm. in thickness, 260 mm. in length and 100 mm. in width, a web of nonwoven fabric containing a deodorant was manufactured by the following method.

As a porous material, a web of nonwoven fabric 2, 10 mm. in thickness and 250 gr./m$^2$ in weight, was transported underneath the vibrating plate 8 together with a support 4 being moved in one direction at a speed of 1.5 m/min. The nonwoven fabric 2 employed was constituted by 50 parts by weight of 15 de. nylon fibers, 50 parts by weight of 15 den. vinylon fibers and a binder of acrylic ester, the ratio of the weight of the fibers relative to the weight of the binder being 30:70.

As a powdery material, a mass of activated carbon particles 3 manufactured by CALGON Corporation of U.S.A. and sold under the tradename of "F400 Pulv" and having an average particle size of 10 $\mu$m were employed and spread over one surface of the nonwoven fabric 2 while the latter is moved together with the support 4 as described above.

The vibrating plate 8 was so positioned that, as the nonwoven fabric web 2 was moved underneath the vibrating plate 8, a slight pressure could be applied to a layer of the spread particles 3 and, through this vibrating plate 8 capable of producing a stripes-patterned mode of vibration, vibrations of 19,750 Hz in frequency and 10 $\mu$m. in amplitude were applied to the layer of the particles 3 to cause the particles 3 to be permeated into the nonwoven fabric web 2.

Subsequent to the application of the vibrations, a binder latex of acrylonitrile butadiene rubber in an amount of 8% by weight was sprayed and, then, dried to the resultant product to fix the activated carbon particles in the nonwoven fabric web.

The cross section of the resultant product, that is, the nonwoven fabric containing the deodorant, has shown that the activated carbon particles were uniformly distributed in the nonwoven fabric without the particles scattered towards other areas than the area confined by the width of the vibrating plate 8.

EXAMPLE II

By the use of the apparatus shown in FIG. 2 wherein the vibrating plate 17 was 1 mm. in thickness and 30 mm. in both width and length, a mass of the same activated carbon particles as in Example I were permeated into each of seven samples of polyurethane foam 18 by applying vibrations through the vibrating plate 17, contacted under a slight pressure to the layer of the particles on one surface of the corresponding sample, while the latter was placed on a support 19. The frequency and amplitude of the vibrations applied per sample of polyurethane foam are tabulated in the following table together with the corresponding test results.

Subsequent to the application of the vibrations, a binder latex of the same composition as in Example I was sprayed to each of the sample and, then, dried to fix the activated carbon particles in the open-celled structure of the corresponding sample.

It is to be noted that the present invention is not intended to be limited to the above examples, but may be applied in driving a powdery flame retardant into a foam plastic to provide a light-weight inflammable construction material. Moreover, the present invention can also be applied in driving a powdery, heat-fusible bonding agent into an porous material so that a nonwoven fabric having an excellent cushioning effect can be obtained only by heating it without any pressure applied.

| SAMPLE NUMBER | FREQUENCY (Hz) | AMPLITUDE ($\mu$m) | DEPTH OF PERMEATION (mm.) | PRESENCE OF SCATTERING OF POWDERY PARTICLES |
|---|---|---|---|---|
| 1 | 50 | 1,500 | 9 | small amount |
| 2 | 50 | 500 | 8 | substantially not |
| 3 | 100 | 500 | 10 | substantially not |
| 4 | 200 | 250 | 10 | substantially not |
| 5 | 500 | 80 | 10 | no |
| 6 | 1,000 | 10 | 10 | no |
| 7 | 1,000 | 5 | 8 | no |
| Comp. 1* | 30 | 2,000 | 8 | yes |
| Comp. 2* | 1,000 | 3 | 3 | no |

(Note: The asterisks represent comparisons.)

Although the present invention has fully been described by way of example, it is to be noted that various changes and modifications are apparent to those skilled in the art. Such changes and modifications are to be understood as included within the true scope of the present invention unless they depart therefrom.

We claim:

1. A method of permeating a powdery material into the porous material of an open-celled structure which comprises spreading the powdery material on one surface of the porous material, and causing the powdery material so spread to permeate into the porous material by the application of vibrations to the powdery material, which vibrations are generated by a vibration generator including a vibrating element in contact with the powdery material spread on the surface of the porous material, with the frequency and amplitude of the vibrations so selected as to minimize scattering of the powdery material, said frequency and amplitude being within the range of 50 to 50,000 Hz and within the range of 50 to 1,500 $\mu$m, respectively, to cause permeation of the powdery particles in the area of the porous material disposed within the area defined by the vibrating element.

2. A method as claimed in claim 1, wherein said porous material is a web of non-woven fabric.

3. A method as claimed in claim 1, wherein said porous material is a polyurethane foam.

4. A method as claimed in claim 1, wherein said powdery material is a mass of activated carbon particles.

5. A method as claimed in claim 1, wherein said vibration generator is an ultrasonic generator.

6. A method as claimed in claim 1, wherein said porous material carrying the powdery material is transported underneath the vibrating element in one direction while contacting the element.

* * * * *